US011082569B2

(12) United States Patent
Maruyama

(10) Patent No.: US 11,082,569 B2
(45) Date of Patent: Aug. 3, 2021

(54) IMAGE PROCESSING APPARATUS AND METHOD AND STORAGE MEDIUM FOR TRANSMITTING DATA TO TRANSMISSION DESTINATION BASED ON DESTINATION AND IDENTIFICATION FROM MOBILE TERMINAL

(71) Applicant: CANON KABUSHIKI KAISHA, Tokyo (JP)

(72) Inventor: Naoki Maruyama, Toride (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/698,049

(22) Filed: Sep. 7, 2017

(65) Prior Publication Data

US 2018/0084120 A1    Mar. 22, 2018

(30) Foreign Application Priority Data

Sep. 16, 2016 (JP) .............................. JP2016-181603

(51) Int. Cl.
  *H04N 1/00* (2006.01)
  *G06K 9/03* (2006.01)
  *H04N 1/32* (2006.01)

(52) U.S. Cl.
  CPC ..... *H04N 1/00212* (2013.01); *H04N 1/00129* (2013.01); *H04N 1/00217* (2013.01); *H04N 1/00411* (2013.01); *G06K 9/033* (2013.01); *H04N 1/00413* (2013.01); *H04N 1/32496* (2013.01)

(58) Field of Classification Search
  None
  See application file for complete search history.

(56) References Cited

U.S. PATENT DOCUMENTS

| 9,883,057 B2 | 1/2018 | Kirihara et al. | |
|---|---|---|---|
| 2006/0017965 A1* | 1/2006 | Tonegawa | G06Q 10/107 358/1.15 |
| 2007/0165268 A1* | 7/2007 | Sodeura | H04N 1/00209 358/1.15 |
| 2007/0285709 A1* | 12/2007 | Yamasaki | G06K 15/00 358/1.15 |
| 2008/0137152 A1* | 6/2008 | Oguri | H04N 1/32064 358/440 |

(Continued)

FOREIGN PATENT DOCUMENTS

| JP | 2013-211922 A | 10/2013 |
|---|---|---|
| JP | 2016-005165 A | 1/2016 |
| JP | 2016-21614 A | 2/2016 |

*Primary Examiner* — Haris Sabah
(74) *Attorney, Agent, or Firm* — Canon U.S.A., Inc. IP Division

(57) ABSTRACT

One or more image processing apparatuses, control methods and storage mediums for use therewith are provided herein. At least one image processing apparatus receives, from a communication terminal, setting information relating to transmission of image data. Upon reception of the setting information from the communication terminal, the image processing apparatus displays a confirmation screen containing a message regarding the setting information. The image processing apparatus displays a different message in the confirmation screen displayed on a display device depending on a condition of the image processing apparatus.

9 Claims, 8 Drawing Sheets

(56) References Cited

U.S. PATENT DOCUMENTS

| | | |
|---|---|---|
| 2010/0182638 A1 | 7/2010 | Kimura et al. |
| 2013/0003113 A1* | 1/2013 | Yamada .................. G06F 3/122 |
| | | 358/1.15 |
| 2013/0003114 A1* | 1/2013 | Maehira ............. H04N 1/00206 |
| | | 358/1.15 |
| 2013/0329250 A1 | 12/2013 | Takamiya |
| 2014/0168694 A1 | 6/2014 | Hiruma |
| 2014/0320886 A1 | 10/2014 | Uchikawa |
| 2015/0089097 A1 | 3/2015 | Isoda et al. |
| 2015/0138598 A1* | 5/2015 | Yamamichi ........ H04N 1/32069 |
| | | 358/1.15 |
| 2016/0124692 A1* | 5/2016 | Nakatsu ................ G06F 3/1207 |
| | | 358/1.15 |
| 2016/0173730 A1* | 6/2016 | Kasuya ................ H04N 1/4413 |
| | | 358/1.14 |
| 2016/0255213 A1 | 9/2016 | Okazawa et al. |
| 2016/0277595 A1* | 9/2016 | Kodaira ............... H04N 1/0022 |
| 2017/0024177 A1* | 1/2017 | Yamaguchi .......... H04N 1/0014 |
| 2017/0064098 A1* | 3/2017 | Inoishi ............... H04N 1/00106 |
| 2018/0077304 A1 | 3/2018 | Sugawara |

\* cited by examiner

| CASE | PROCESSING PATTERN |
|---|---|
| ‹CASE 1› NO SETTING REQUEST | PROCESSING PATTERN 1 |
| ‹CASE 2› SETTING REQUEST HAS BEEN RECEIVED FROM NON-MATE DEVICE, AND ANOTHER SETTING REQUEST IS RECEIVED FROM MATE DEVICE | PROCESSING PATTERN 2 |
| ‹CASE 3› SETTING REQUEST HAS BEEN RECEIVED FROM MATE DEVICE, AND SETTING REQUEST IS RECEIVED AGAIN FROM MATE DEVICE | PROCESSING PATTERN 3 |

IMAGE PROCESSING APPARATUS AND METHOD AND STORAGE MEDIUM FOR TRANSMITTING DATA TO TRANSMISSION DESTINATION BASED ON DESTINATION AND IDENTIFICATION FROM MOBILE TERMINAL

BACKGROUND OF THE INVENTION

Field of the Invention

The present disclosure relates to one or more embodiments of an image processing apparatus that sets destination information sent from a terminal device as the transmission destination of image data, and to one or more respective embodiments of a method and a storage medium for controlling an image processing apparatus.

Description of the Related Art

In recent years, image processing apparatuses have been developed that each have multiple functions, including a scanning function, a printing function, a copying function, an image data transmission function, and/or other similar functions. For transmission of image data using such an image processing apparatus, the destination of the transmission can be specified, for example, by selecting a destination registered in an address book provided in the image processing apparatus, or by directly entering a destination using a control panel. There is also a growing need to employ data stored in a mobile terminal for business purposes. One example of use of a mobile terminal for business purposes is described in Japanese Patent Laid-Open No. 2016-21614, which discloses a function for cooperative operation between an image processing apparatus, such as a multi-function peripheral (MFP), and a mobile terminal.

SUMMARY OF THE INVENTION

Examples of cooperative function may include a cooperative function in which a mobile terminal transmits destination information stored in that mobile terminal to an image processing apparatus, and the destination information is added as a destination for use in a transmission function of the image processing apparatus. Such cooperative function permits a user to operate a familiar mobile terminal to set a destination for use by the image processing apparatus, thereby enhancing the usability of the apparatus. At least one embodiment of an image processing apparatus includes: a display device; and at least one processor, wherein the at least one processor acts as the following: a transmitter configured to transmit image data to an exterior of the image processing apparatus, a receiver configured to receive, from a communication terminal, setting information relating to transmission of the image data performed by the transmitter, and a display controller configured to display, on the display device, a confirmation screen containing a message regarding the setting information, wherein upon a condition that the setting information is received from the communication terminal, the display controller displays a different message in the confirmation screen displayed on the display device depending on a condition of the image processing apparatus.

According to other aspects of the present disclosure, one or more additional image processing apparatuses, one or more control methods, and one or more storage mediums for use therewith are discussed herein. Further features of the present disclosure will become apparent from the following description of exemplary embodiments (with reference to the attached drawings).

DESCRIPTION OF THE EMBODIMENTS

A preferred embodiment of the present disclosure will be described below with reference to the drawings. An image processing apparatus is often used in a shared manner by multiple users. Accordingly, when a first user (e.g., user A) is operating an operation unit in the main body of the image processing apparatus to set a destination, a second user (e.g., user B) different from user A operating the operation unit may transmit destination information to the image processing apparatus from a mobile terminal.

Overwriting of the setting of the transmission function with the destination information transmitted by the second user would add a destination unknown to the first user without being noticed by the first user, who has been using the image processing apparatus, thereby creating a setting unintended by the first user. There may also be a case in which a first user transmits destination information from a mobile terminal to the image processing apparatus to overwrite the setting of the transmission function with the destination, after which a second user transmits another destination to the image processing apparatus.

This embodiment provides a mechanism for enhancing user convenience when destination information and/or setting information for the transmission function is received from a terminal device. This embodiment will be described below.

Figure 1:
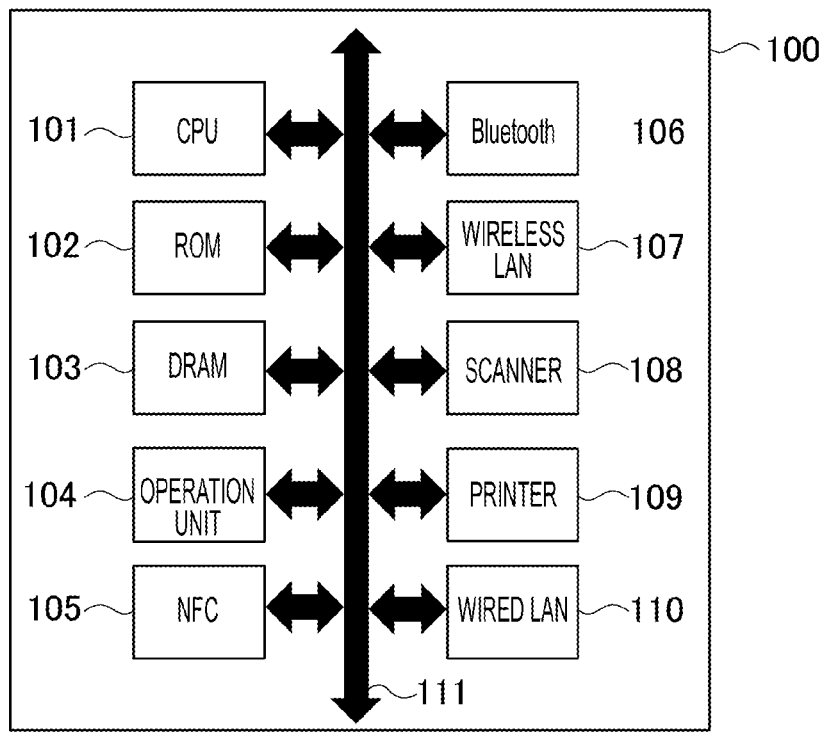
FIG. 1 is a diagram illustrating an example of a hardware configuration of a multifunctional apparatus.

FIG. 1 illustrates a hardware configuration of a multifunctional apparatus 100 serving as an example of the image processing apparatus. The multifunctional apparatus 100 includes a central processing unit (CPU) 101, a read-only memory (ROM) 102, a dynamic RAM (DRAM) 103, an operation unit 104, a near field communication (NFC) interface 105, a Bluetooth® interface 106, a wireless LAN interface 107, a scanner 108, a printer 109, and a wired LAN interface 110. The multifunctional apparatus 100 also includes a data bus 111. The CPU 101 is the controller of the system, and controls the entire system. The ROM 102 includes a flash memory, such as an embedded multimedia card (eMMC). The ROM 102 stores a control program of the CPU 101, and also stores data, such as a set value and/or image data, that should not be erased even after power off. The DRAM 103 stores program control parameters and/or the like. The DRAM 103 is a volatile memory for temporarily storing image data to be processed and/or the like. A function or process of the multifunctional apparatus 100 hereinafter described is performed by reading a program stored in the ROM 102, and executing the program by the CPU 101.

The operation unit 104 is an interface unit for displaying information held in the device and/or an operation screen, and receiving an input from a user (operator). The NFC interface 105 and the Bluetooth interface 106 employ near field communication technology to allow the multifunctional apparatus 100 and a nearby device to communicate with each other. The wireless LAN interface 107 is an interface unit for managing two-way communication via an access point or directly with a network device.

The scanner 108 captures an image on a source document, and generates image data, such as binary data, from that image. The image data generated by the scanner 108 is transferred to, and then stored in, the ROM 102 or the DRAM 103 via the data bus 111. The image data generated by the scanner 108 is transmitted to an external device through a network, and/or is printed on a sheet. The printer 109 outputs the image data on printing paper. The wired LAN interface 110 is an interface unit for managing two-way communication with a network device. Unlike the wireless LAN interface 107, the wired LAN interface 110 establishes a connection with a network using a physical cable, such as a LAN cable. The control units of these components are connected to one another via the data bus 111.

Figure 2:
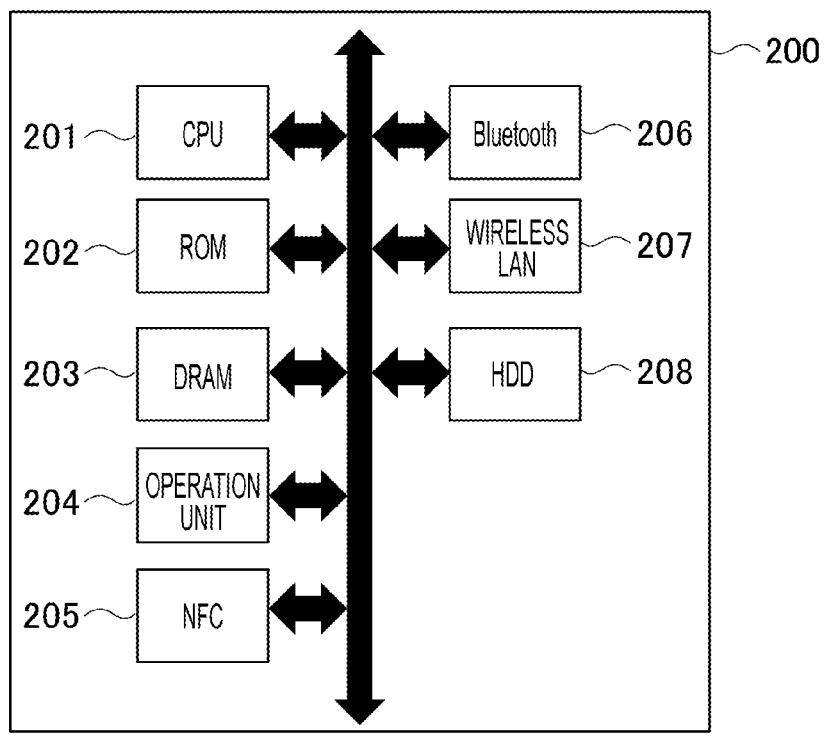
FIG. 2 is a diagram illustrating an example of a hardware configuration of a mobile terminal device.

FIG. 2 illustrates a hardware configuration of a mobile terminal device 200. This embodiment assumes the mobile terminal device 200 to be a device such as a smartphone or a tablet PC. However, the mobile terminal device 200 may be other type of information processing device capable of communication using the wireless LAN interface 207. The mobile terminal device 200 includes a CPU 201, a ROM 202, a DRAM 203, an operation unit 204, an NFC interface 205, a Bluetooth interface 206, a wireless LAN interface 207, and a hard disk drive (HDD) 208.

The CPU 201 reads a control program stored in the ROM 202, and performs various processes for controlling operations of the mobile terminal device 200. The ROM 202 stores a control program. The DRAM 203 is used as a temporary storage area, such as the main memory of the CPU 201 or a work area. The HDD 208 stores various data, such as a picture and/or an electronic document. A function or process of the mobile terminal device 200 hereinafter described is performed by reading a program stored in the ROM 202 or in the HDD 208, and executing the program by the CPU 201.

The operation unit 204 has a touch panel function capable of sensing a touch operation of a user, and also displays various screens provided by an operating system (OS) and an electronic mail (email) transmission application. Performing a touch operation on the operation unit 204 by a user can input a desired operation instruction to the mobile terminal device 200. The mobile terminal device 200 also includes a hardware key (not shown), which may be used by the user to input an operation instruction to the mobile terminal device 200. The NFC interface 205 and the Bluetooth interface 206 employ near field communication technology. The wireless LAN interface 207 is an interface unit for managing two-way communication with a network device.

This embodiment assumes that a mobile application capable of communication with the multifunctional apparatus 100 has been installed in the mobile terminal device 200. This embodiment also assumes that the multifunctional apparatus 100 is capable of communication with two or more mobile terminal devices simultaneously, and that the multifunctional apparatus 100 receives a destination information setting request and destination information from each of the mobile terminal devices. As used herein, the term "destination information" refers to information about a destination of image data to be transmitted from the multifunctional apparatus 100. Destination information as used in this embodiment includes an email address as the destination of the image data to be transmitted. In this embodiment, in addition to the destination information, data transmitted from each of the mobile terminal devices to the multifunctional apparatus 100 may also include other setting information relating to the transmission of image data. Examples of such other setting information include an email subject, an email message body, and a file name of a file attached to an email in Scan to Email function described below. In this embodiment, destination information and such other setting information are collectively referred to as "setting information." The term "destination information" in the following description can also be read as "setting information."

Figure 3:
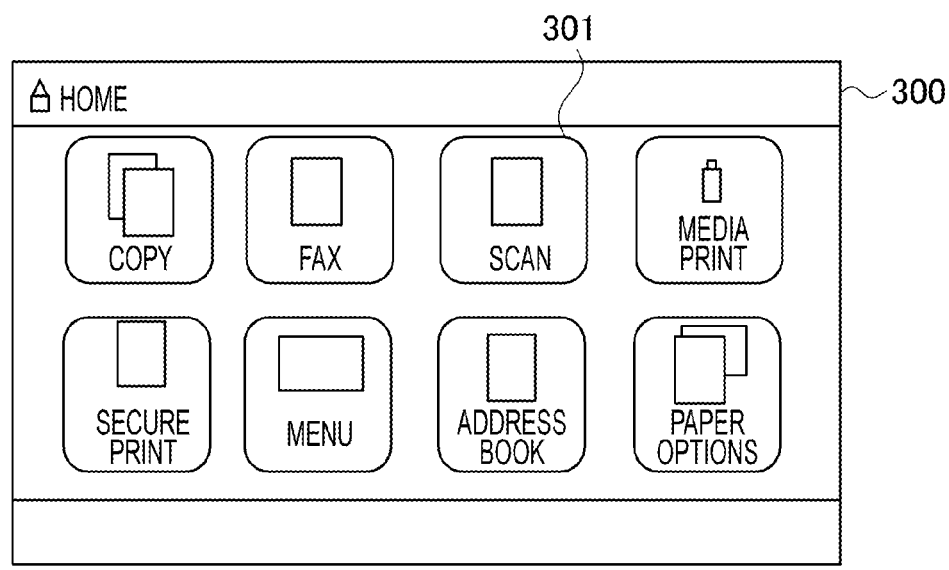
FIG. 3 is a diagram illustrating an example of the home screen.
Figure 4:
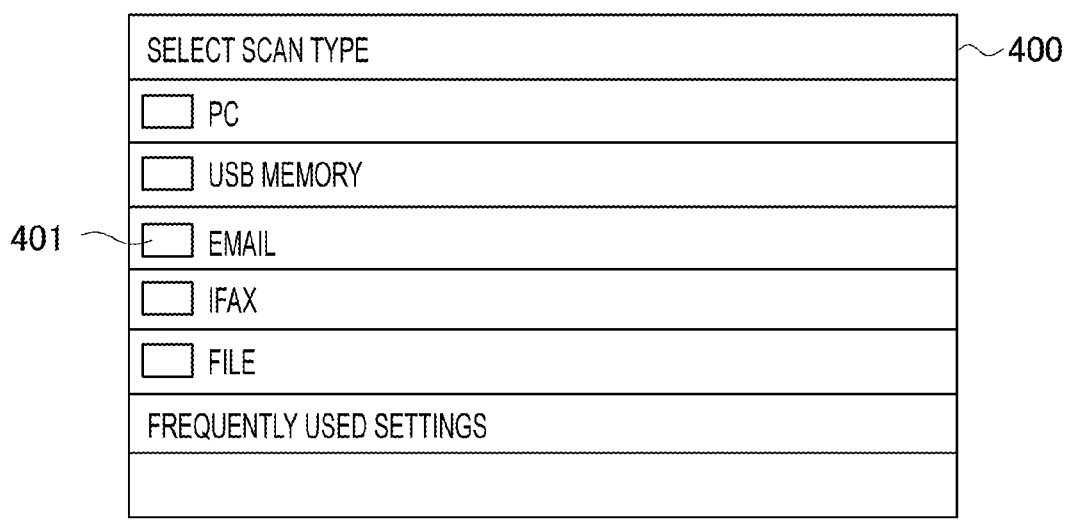
FIG. 4 is a diagram illustrating an example of a settings screen of a scanning function.
Figures 5, 6:
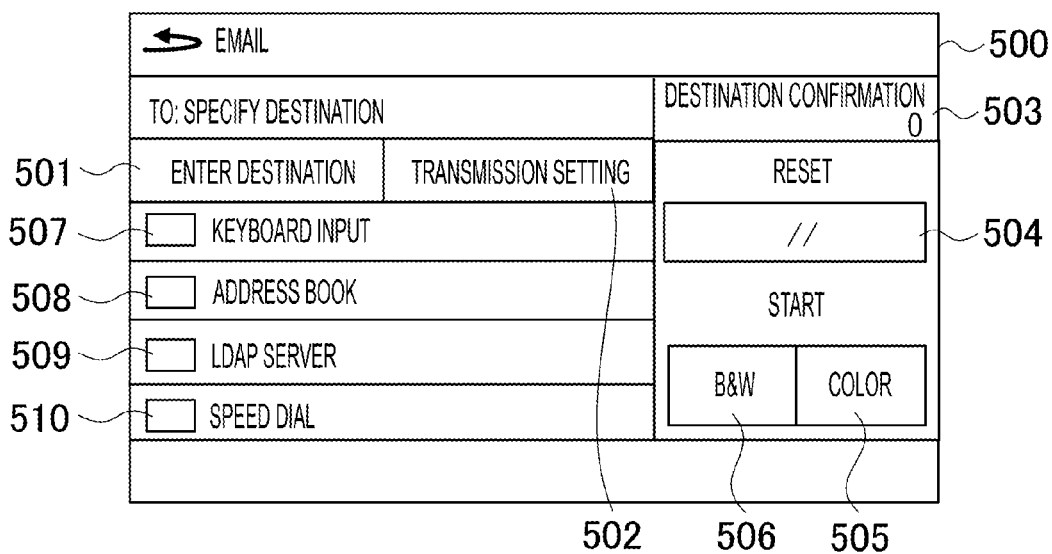
FIG. 5 is a diagram illustrating an example of a settings screen of Scan to Email function.
FIG. 6 is a diagram illustrating an example of patterns of processing performed when a destination information setting request is received.

Referring to FIGS. 3 to 5, operation screens of the multifunctional apparatus 100 will next be described. When a user starts to use the multifunctional apparatus 100, the CPU 101 provides control to display a home screen 300 for selecting a process to be performed, on the display panel of the operation unit 104. FIG. 3 illustrates an example of the home screen 300. The home screen 300 has icons displayed thereon, such as copy and facsimile, for performing various functions usable in the multifunctional apparatus 100. The user can select, on the home screen 300, a function provided in the multifunctional apparatus 100, such as a copying function or a transmission function, through the operation unit 104.

FIG. 4 illustrates an example of a scanning function settings screen 400. When the user selects an icon 301 representing the scanning function in the home screen 300, the CPU 101 provides control to display the scanning function settings screen 400 on the display panel of the operation unit 104. Note here that the scanning function includes a transmission function. The user can select a type of transmission on the settings screen 400. For example, the user can select one of the options displayed on the settings screen 400 depending on the device for storing, or the destination for transmitting, the scanned data with respect to, for example, saving to a USB flash memory, or email transmission.

FIG. 5 illustrates an example of a settings screen 500 of Scan to Email function (email transmission function). When the user selects an icon 401 representing email transmission on the settings screen 400 illustrated in FIG. 4, the CPU 101 provides control to display the settings screen 500 of Scan to Email function on the display panel of the operation unit 104. The settings screen 500 has tabs for switching between screens, including an enter destination tab 501 for entering a destination, and a transmission setting tab 502 that allows setting of document scanning for scanning, and of the subject and the message body of an email to be transmitted. The settings screen 500 further displays a number-of-registered-destinations indication 503, a setting reset button 504, start buttons 505 and 506, a keyboard input button 507, an address book button 508, an LDAP server button 509, a speed dial button 510, and the like.

The use of the buttons 507 to 510 allows selection and/or entering of a destination to transmit a content of the scanned document. More specifically, selection of the keyboard input button 507 displays a keyboard on the display panel of the operation unit 104, thus allowing a destination to be entered. Selection of the address book button 508 or the speed dial button 510 causes the CPU 101 to respectively read address book data or speed dial data stored in the ROM 102 of the multifunctional apparatus 100 to display email addresses. Selection of the LDAP server button 509 causes the CPU 101 to access a database to acquire email addresses, and to display these email addresses on the display panel of the operation unit 104, thus allowing the user to select an address therefrom. Selection of the reset button 504 causes the CPU 101 to clear the values set in the settings screen 500 to bring the settings screen 500 back to an initial state.

Selection of the start button 505 or 506 causes color or black-and-white scanning to start, causing the scanner 108 to scan a source document put in place in the multifunctional apparatus 100 to generate binary data of the scanned matter. The CPU 101 then transmits, via either the wireless LAN interface 107 or the wired LAN interface 110, the image data to the destination set in the settings screen 500. Upon completion of the process, the CPU 101 clears the values set in the settings screen 500 to bring these values back to the initial values.

The multifunctional apparatus 100 of this embodiment receives destination information registered in the mobile terminal device 200, and registers that destination information as the destination to transmit the data acquired by scanning by the multifunctional apparatus 100. Destination information as used in this embodiment includes a destination address received from the mobile terminal device 200 to be registered in the multifunctional apparatus 100, the subject and the message body of a message in association with transmission of scanned data from the multifunctional apparatus 100 to the destination address. The multifunctional apparatus 100 provides control as follows: the multifunctional apparatus 100 accepts an input of destination information from the mobile terminal device 200 if the input is received when a predefined screen is being displayed in the operation unit 104; and the multifunctional apparatus 100 does not accept an input of destination information from the mobile terminal device 200 if the input is received when a predefined screen is not being displayed in the operation unit 104. This control prevents the displayed screen from being switched to the transmission settings screen when the user is using other function, such as a copying function.

For example, when one of the home screen 300, the scanning function settings screen 400, and the email settings screen 500 is being displayed on the display panel, the multifunctional apparatus 100 receives destination information without limitation. Thus, all the mobile terminal devices 200 connected to the multifunctional apparatus 100 can transmit destination information to the multifunctional apparatus 100 without limitation. On the contrary, when a screen other than the screens listed above is being displayed on the display panel, the multifunctional apparatus 100 does not accept any input of destination information. That is, no mobile terminal devices 200 can transmit destination information to the multifunctional apparatus 100.

Note here that the multifunctional apparatus 100 is often used in a shared manner by multiple users. Accordingly, when a first user (e.g., user A) is operating the operation unit 104 in the main body of the image processing apparatus to set a destination, a second user (e.g., user B) different from user A operating the operation unit 104 may transmit destination information from a mobile terminal.

Thus, even when a predefined screen is displayed on the display panel, the following issue may arise: overwriting of the setting of the transmission function with the destination transmitted by a different user B during the operation of user A would add a destination unknown to user A without being noticed by user A, who has been using the image processing apparatus, thereby creating a setting unintended by user A. There may also be a case in which a first mobile terminal user (e.g., user C) transmits destination information to the image processing apparatus to overwrite the setting of the transmission function with that destination, after which a second user (e.g., user D) transmits another destination to the image processing apparatus. In either case, a destination unknown to the first user will be added without being noticed by the first user, thereby creating a setting unintended by the first user.

To address this situation, one control method may be conceived in which when a first user transmits destination information from a mobile terminal to the image processing apparatus to overwrite the setting of the transmission function with that destination, the image processing apparatus is deemed as being used by the first user, and therefore, no input from a second user is accepted until the transmission function completes the processing. However, this control method is disadvantageous in that if the first user leaves the image processing apparatus without performing any further operation on the image processing apparatus after the transmission of destination information from the mobile terminal to the image processing apparatus, a second user cannot set a destination from another mobile terminal. In this case, the second user will need to wait for completion of use of the first user, or to reset the setting made by the first user, on the operation screen of the image processing apparatus, and then to transmit again the destination information. This operation would be complicated.

In view of the aforementioned issues, this embodiment provides a mechanism for enhancing user convenience when destination information and/or setting information for the transmission function is received from a terminal device. The control operation will be described below in detail.

A description will be given below on processes of controlling a displayed content on the display panel of, and destination information registration in, the multifunctional apparatus 100 upon reception of a destination information setting request, depending on the situation of use of the multifunctional apparatus 100, and on the connectivity condition between the multifunctional apparatus 100 and the mobile terminal device 200. A mobile terminal device 200 that has sent the setting request in process is hereinafter referred to as "mate device," and a mobile terminal device 200 other than the mate device is hereinafter referred to as "non-mate device."

FIG. 6 illustrates patterns of processing performed when a destination information setting request is received. There are three cases in receiving a setting request, and the three cases respectively have patterns of processing performed by the multifunctional apparatus 100. Case 1 assumes that the multifunctional apparatus 100 has received no setting request. Case 2 assumes that, at the time of reception of a setting request from the mate device, there is already a setting request received from a non-mate device. Case 3 assumes that, at the time of reception of a setting request from the mate device, there is already a setting request received from the same device (i.e., mate device).

Figure 7:
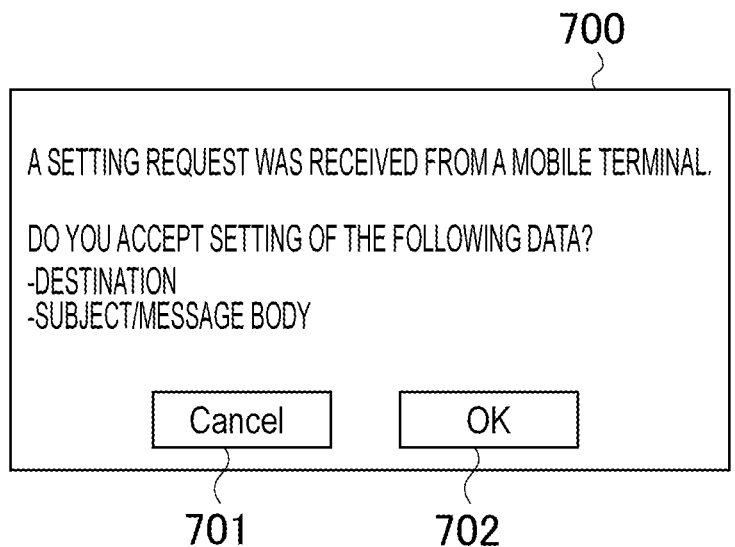
FIG. 7 is a diagram illustrating an example of a first confirmation screen.

FIG. 7 illustrates an example of a first confirmation screen 700 popping up in the display panel by control of the CPU 101 in Case 1 when a setting request is received from the mate device. The first confirmation screen 700 displays a message informing that a setting request is received. A cancel button 701 and an OK button 702 are also displayed. A press of the cancel button 701 by the user causes the CPU 101 to reject setting of the destination information corresponding to the setting request. In contrast, a press of the OK button 702 by the user causes the CPU 101 to allow registration of the destination information corresponding to the setting request. In this case, when destination information is received from the mate device, the CPU 101 sets corresponding pieces of the destination information to the transmission destination, to the email message body, and to the email subject for Scan to Email function.

As described above, the CPU 101 displays the first confirmation screen 700 to control acceptance/rejection of the destination information in response to an input from the operator. That is, the first confirmation screen 700 is displayed to confirm intention of the user to set the destination information corresponding to the setting request. This process can thus prevent a destination from being added without being noticed by the operator when someone (operator) is directly operating Scan to Email function of the multifunctional apparatus 100 on the display panel of the operation unit 104 upon reception of a setting request.

Figure 8:
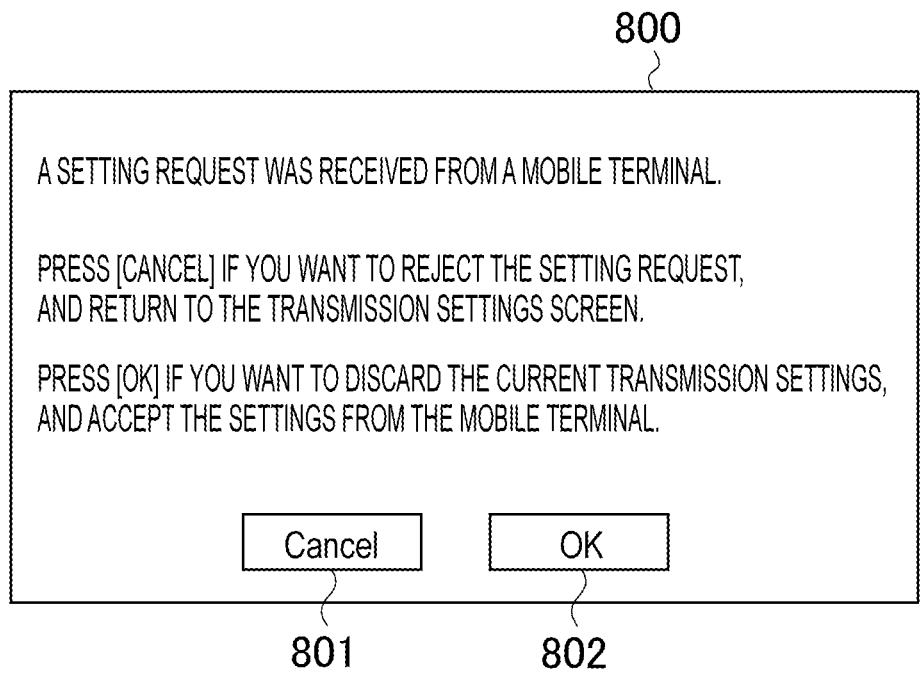
FIG. 8 is a diagram illustrating an example of a second confirmation screen.

FIG. 8 illustrates an example of a second confirmation screen 800 popping up in the display panel by control of the CPU 101 in Case 2 when a setting request is received from the mate device. The second confirmation screen 800 displays a message informing that a setting request is received. A cancel button 801 and an OK button 802 are also displayed. A press of the cancel button 801 by the user causes the CPU 101 to reject the setting request from the mate device, and continues the processing with respect to the setting request that was in process at the beginning of the process (i.e., the setting request that had been received from a non-mate device). Meanwhile, a press of the OK button 802 by the user causes the CPU 101 to first clear the settings that were valid at the beginning of the process, to accept the setting request from the mate device, and to switch the device to receive destination information from the non-mate device to the mate device. The CPU 101 then sets the destination information received from the mate device as the new destination information.

As described above, the CPU 101 displays, in the second confirmation screen 800, a message informing that a setting request is received from the mate device after another setting request has been received from a non-mate device. That is, the second confirmation screen 800 is displayed to confirm intention of the user to set the destination information corresponding to the setting request from the mate device when a setting request is received from the mate device, and another setting request has also been received from a non-mate device. This process can thus prevent the user of a non-mate device from accidentally setting the destination information transmitted from the mate device, mistaking as the destination information transmitted by his or her own operation. In addition, the user of the mate device, who is the later user, can set destination information even when the multifunctional apparatus 100 has been left without any further operation performed after a setting request is transmitted or destination information is set before the reception of the setting request from the mate device.

In Case 3, the multifunctional apparatus 100 sets the destination information without displaying a pop-up window on the display panel. This process prevents a window from being popped up each time a setting request is received, and thus prevents a reduction in user convenience.

Figure 9:
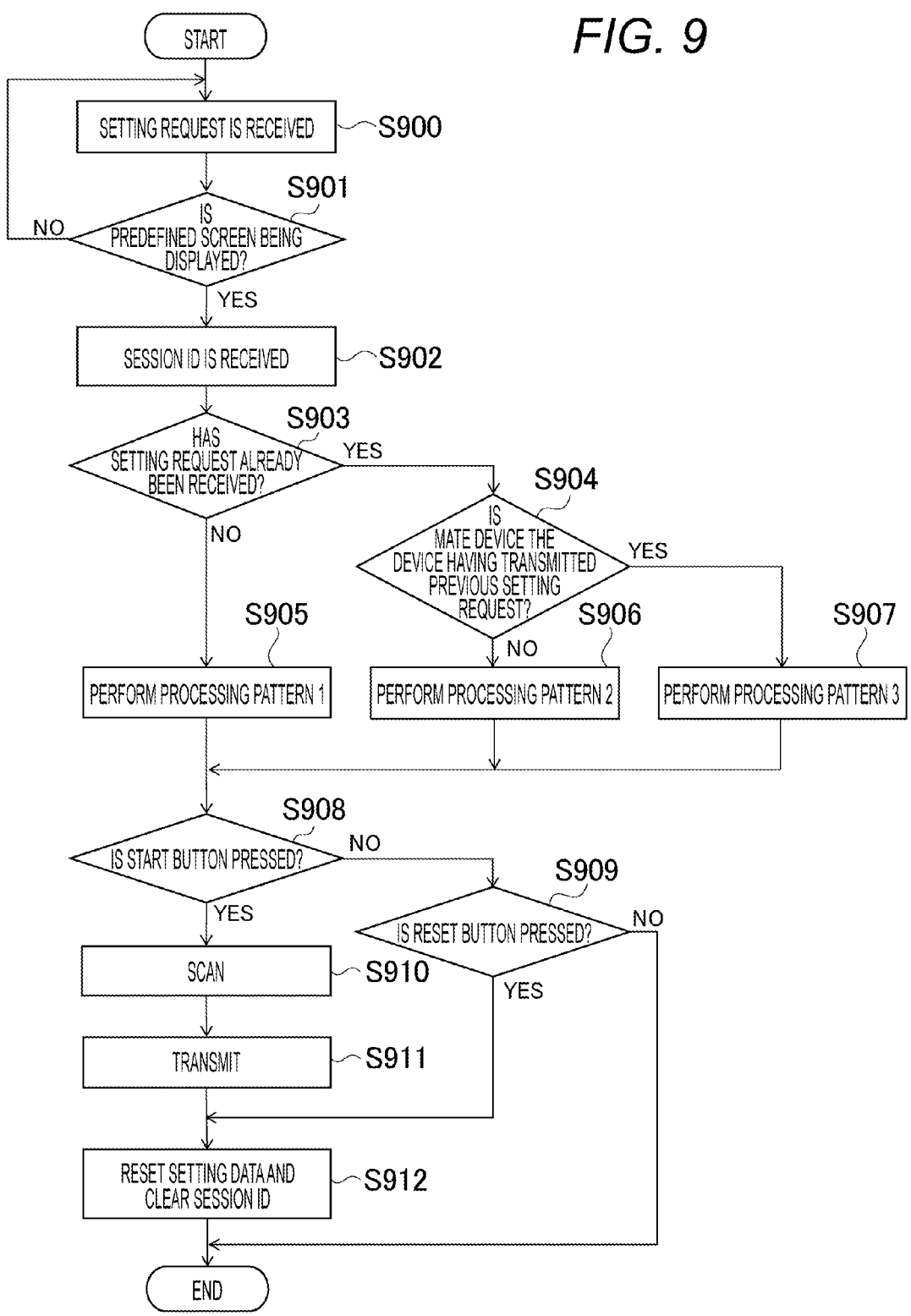
FIG. 9 is a flowchart of an example of a control process performed by a multifunctional apparatus.

FIG. 9 is a flowchart of an example control process performed by the multifunctional apparatus 100. A control process is performed by the CPU 101, which reads a control program stored in the ROM 102, loads the control program into the DRAM 103, and executes the control program. In another example, the multifunctional apparatus 100 may include multiple CPUs, DRAMs, ROMs, and storages, and these devices may collaboratively perform a control process. In still another example, the multifunctional apparatus 100 may perform a part of a control process using a hardware circuit.

At step S900, the CPU 101 receives a destination information setting request from a mobile terminal device 200. Hereinafter, the mobile terminal device 200 that has sent the setting request received at step S900 is referred to as mate device, and a mobile terminal device 200 other than the mate device is referred to as non-mate device.

Next, at step S901, the CPU 101 checks whether one of predefined screens is displayed on the display panel upon reception of the setting request. As used herein, the predefined screens include the home screen 300, the settings screen 400, and the settings screen 500. It is assumed here that the predefined screens may be used to set destination information, and are preset, for example, in the ROM 102 or in other component of the multifunctional apparatus 100. In this embodiment, the home screen 300 and scanning function-related screens are preset as predefined screens. Examples of screen other than the predefined screens include a screen for copying. If one of the predefined screens is being displayed (YES at step S901), the CPU 101 allows setting of the destination information, and advances the process to step S902. If no predefined screen is being displayed (NO at step S901), the CPU 101 disallows setting of the destination information, and returns the process to step S900. The process at step S901 is an example of setting control process for controlling destination information setting on the display screen displayed on the display panel, serving as the display unit, upon reception of the setting request.

Next, at step S902, the CPU 101 receives a session ID from the mobile terminal device 200. As used herein, a session ID is a piece of information required for establishing communication between the multifunctional apparatus 100 and a mobile terminal device 200 to use the destination registration function. Next, at step S903, the CPU 101 checks whether there is a setting request that has already been received from the mate device or from a non-mate device before the reception of the current setting request. A setting request that may have already been received from the mate device or from a non-mate device before the reception of the current setting request is hereinafter referred to as "previous setting request." The CPU 101 determines that no previous setting request has been received if the session ID stored in the ROM 102 or in the DRAM 103 has an initial value. Otherwise, the CPU 101 determines that a previous setting request has been received if the session ID has a value other than the initial value. If a previous setting request has been received (YES at step S903), the CPU 101 advances the process to step S904. If no previous setting request has been received (NO at step S903), the CPU 101 advances the process to step S905.

At step S904, the CPU 101 checks whether the device that has transmitted the previous setting request is the mate device. If the session ID stored in the DRAM 103, or other component, and the session ID received at step S902 match, the CPU 101 determines that both devices are the same. If both devices are a same device (YES at step S904), the CPU 101 advances the process to step S907. If both devices are different devices (NO at step S904), the CPU 101 advances the process to step S906.

At step S905, the CPU 101 performs the process of processing pattern 1. The process of processing pattern 1 will be described below with reference to FIG. 10. At step S906, the CPU 101 performs the process of processing pattern 2. This process will be described below with reference to FIG. 11. At step S907, the CPU 101 performs the process of processing pattern 3. The process of processing pattern 3 will be described below with reference to FIG. 12. Each of the processes of processing patterns 1 to 3 receives destination information, checks whether the destination information should be set as the destination of the function (scanning function) in process, and sets the destination information as the destination as appropriate.

After performing step S905, S906, or S907, the CPU 101 advances the process to step S908. At step S908, the CPU 101 checks whether the start button 505 or 506 has been pressed by the user. If the start button 505 or 506 has been pressed (YES at step S908), the CPU 101 advances the process to step S910. If neither the start button 505 nor 506 has been pressed (NO at step S908), the CPU 101 advances the process to step S909.

At step S909, the CPU 101 checks whether the reset button 504 has been pressed. If the reset button 504 has been pressed (YES at step S909), the CPU 101 advances the process to step S912. If the reset button 504 has not been pressed (NO at step S909), the CPU 101 terminates the process. At step S910, the CPU 101 performs scan processing to scan a source document put in place in the multifunctional apparatus 100, and generate binary data of the scanned matter. Next, at step S911, the CPU 101 transmits the binary data generated at step S910 to the destination. Then, at step S912, upon completion of transmission of the scanned data or a request for resetting the settings, the CPU 101 resets the setting data and clears the session ID. Note that the setting request received at step S900 in the flowchart of FIG. 9 may contain destination information (or setting information). In this case, step S1000 of FIG. 10, step S1104 of FIG. 11, and step S1200 of FIG. 12 described below are not performed.

Figure 10:
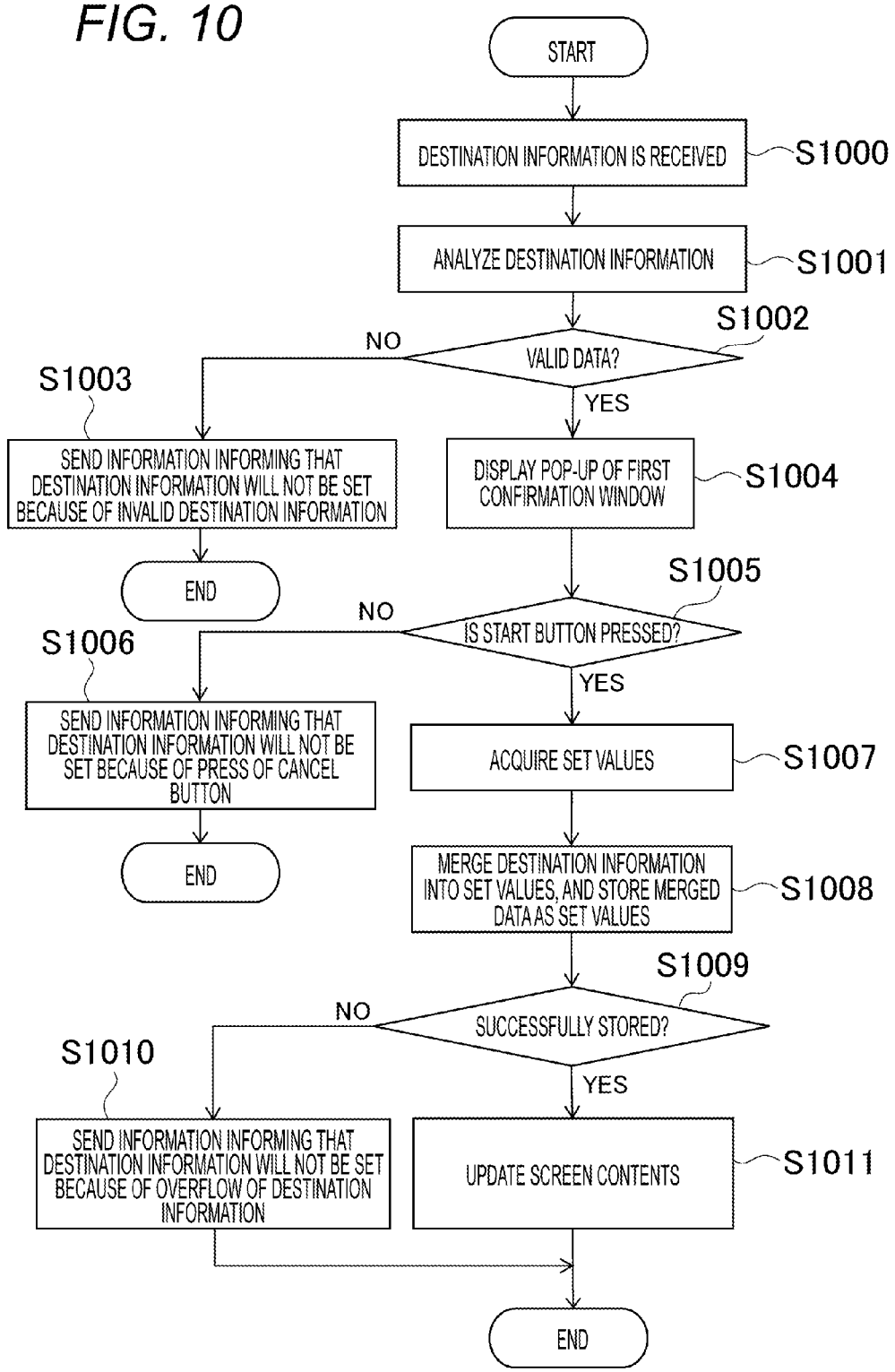
FIG. 10 is a flowchart of an example of a process of processing pattern 1.

FIG. 10 is a flowchart of the process of processing pattern 1 (step S905). At step S1000, the CPU 101 receives destination information from the mate device. Next, at step S1001, the CPU 101 analyzes the destination information received, and checks validity of the destination information. More specifically, the CPU 101 checks whether the length of character string of the destination falls within a predefined length, whether the character code is compliant to the applicable rule, and the like. If the destination information is valid (YES at step S1002), the CPU 101 advances the process to step S1004. If the destination information is not valid (NO at step S1002), the CPU 101 advances the process to step S1003. At step S1003, the CPU 101 sends, to the mate device, information informing that the destination information will not be set because of invalid destination information, and then terminates the process.

At step S1004, the CPU 101 provides control to display the first confirmation screen 700 of FIG. 7 on the display panel to inquire of the user whether to overwrite the setting with the destination information. Next, at step S1005, the CPU 101 determines which button is pressed by the user. If the OK button 702 is pressed (YES at step S1005), the CPU 101 advances the process to step S1007. If the cancel button 701 is pressed (NO at step S1005), the CPU 101 advances the process to step S1006. In the case of a press of the OK button 702, the CPU 101 accepts the instruction to set the destination information. In the case of a press of the cancel button 701, the CPU 101 accepts the instruction to discard the destination information. At step S1006, the CPU 101 sends, to the mate device, information informing that the destination information will not be set because of the press of the cancel button, and terminates the process without setting the destination information.

At step S1007, the CPU 101 acquires set values, such as the destination, and the subject and the message body of the email for scanned data transmission, that are set at the time of processing in association with the scanning function of the multifunctional apparatus 100. More specifically, the CPU 101 acquires set values stored in the ROM 102 and/or in the DRAM 103. Next, at step S1008, the CPU 101 merges the destination information received at step S1000 into the set values at the time of processing, and stores the merged data in the ROM 102 or in other component.

Next, at step S1009, the CPU 101 checks whether the merged set values generated at step S1008 are successfully stored in the ROM 102 or in other component. If the storage operation is successful (YES at step S1009), CPU 101 advances the process to step S1011. If the storage operation is not successful (NO at step S1009), the CPU 101 advances the process to step S1010. At step S1010, the CPU 101 sends, to the mate device, information informing that the destination information will not be set because the input data has an amount that would cause an overflow of the storage area available in the ROM 102 or in other component, and the CPU 101 then terminates the process. At step S1011, the CPU 101 updates the screen displayed on the display panel to reflect the set values newly stored in the ROM 102 or in other component. For example, CPU 101 increments the number of destinations displayed in the number-of-registered-destinations indication 503 by the number of the destinations newly registered.

Figure 11:
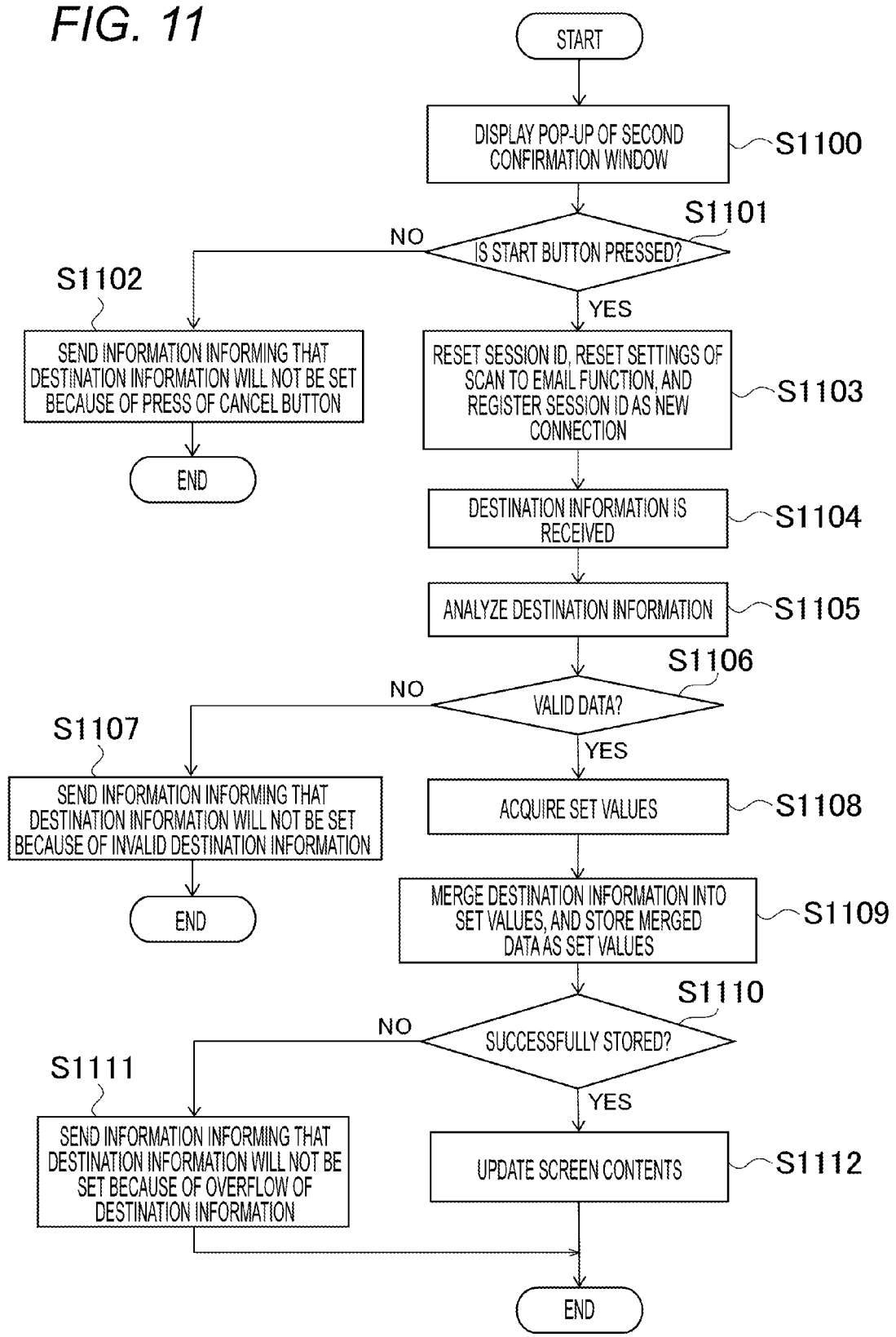
FIG. 11 is a flowchart of an example of a process of processing pattern 2.

FIG. 11 is a flowchart of the process of processing pattern 2 (step S906). At step S1100, the CPU 101 provides control to display the second confirmation screen 800 of FIG. 8 on the display panel to inquire of the user whether to continue the process on the basis of the setting request transmitted by the user of the mate device. Next, at step S1101, the CPU 101 determines which button has been pressed by the user. If the OK button 802 has been pressed (YES at step S1101), the CPU 101 advances the process to step S1103. If the cancel button 801 has been pressed (NO at step S1102), the CPU 101 advances the process to step S1102. At step S1102, the CPU 101 sends, to the mate device, information informing that the destination information will not be set because of the press of the cancel button. As the cancel button 801 is pressed, the CPU 101 terminates the display of the second confirmation screen 800 and switches the screen displayed on the display panel to the setting screen before accepting the setting request. Thus, it is possible to discard the setting based on the setting request and return to the setting screen based on the setting request already received from the other apparatus. Upon completion of the process relating to the depression of the cancel button, the CPU 101 terminates the process.

At step S1103, the CPU 101 disconnects a connection with the mate device that was in connection at the time of processing, and establishes a connection with a new mate device that has newly transmitted the setting request in step S900. Thereafter, the CPU 101 treats the new mate device that has newly established a connection as a mate device. More specifically, the CPU 101 resets the session ID stored in the ROM 102 or in the DRAM 103, and stores a new session ID corresponding to the new mate device received at step S902, and resets the current settings for the scanning function.

Next, at step S1104, the CPU 101 receives destination information from the mate device. Next, at step S1105, the CPU 101 analyzes the destination information received. This step is similar to step S1001 of FIG. 10. If the destination information is valid information (YES at step S1106), the CPU 101 advances the process to step S1108. If the destination information is invalid information (NO at step S1106), the CPU 101 advances the process to step S1107. At step S1107, the CPU 101 sends, to the mate device, information informing that the destination information will not be set because of invalid destination information, and then terminates the process.

At step S1108, the CPU 101 acquires set values, such as the destination, and the subject and the message body of the email for scanned data transmission, that are set at the time of processing in association with the scanning function of the multifunctional apparatus 100. This step is similar to step S1007 of FIG. 10. Subsequent steps S1109 to S1112 are similar respectively to steps S1008 to S1011 of FIG. 10.

Figure 12:
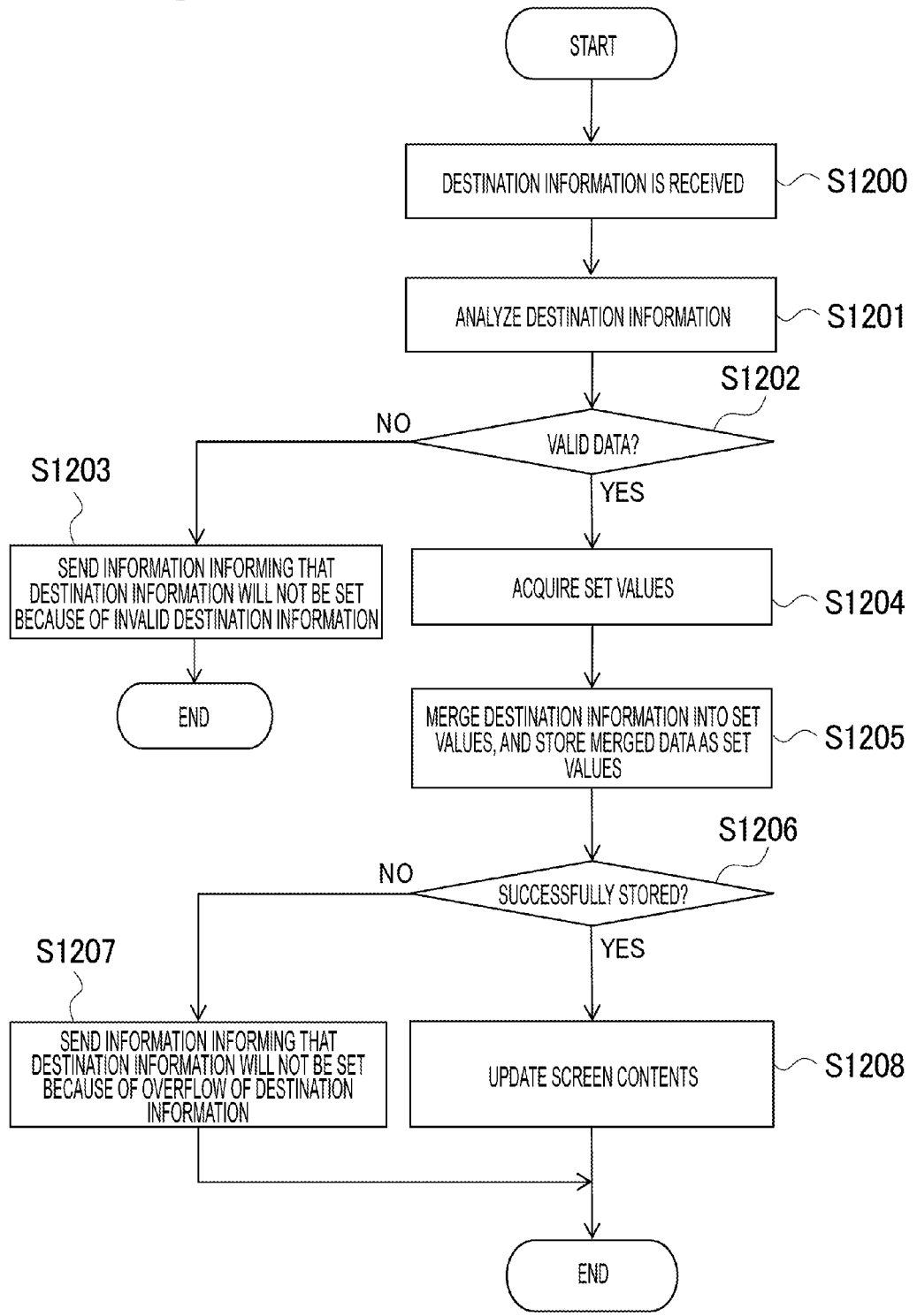
FIG. 12 is a flowchart of an example of a process of processing pattern 3.

FIG. 12 is a flowchart of the process of processing pattern 3 (step S907). This process is similar to the process of processing pattern 1 described referring to FIG. 10 except that the steps in relation to the inquiry to the user (i.e., steps S1004, S1005, and S1006 of FIG. 10) are not performed. That is, in processing pattern 3, the CPU 101 provides control to avoid displaying a new screen each time another setting request is received in a case in which a previous setting request has already been received from the mate device.

Note that steps S903 to S907 (see FIGS. 9 to 12) exemplify a control operation for providing a display depending on the status of the multifunctional apparatus 100, such as the screen displayed on the display panel upon reception of a destination information setting request, and reception conditions of other setting requests.

As described above, the multifunctional apparatus 100 is capable of suitably changing questions to ask the user depending on the connectivity condition with a mobile terminal device and on a reception condition of setting request. For example, when there is no connection established with a mobile terminal device, inquiring of the user whether to overwrite the current setting with the destination information received from a new mobile terminal can prevent unintended destination information from being added during operation of the image processing apparatus. Furthermore, for example, when a setting request has already been received from one mobile terminal device, and another setting request is received from another mobile terminal device, the user may be asked whether to accept or reject the setting request received later. Thus, even if the image processing apparatus is left without any further operation performed after the settings are overwritten by the destination information received from the previous mobile terminal device, a next user can set destination information. Accordingly, the multifunctional apparatus 100 can enhance user convenience when destination information is received from a mobile terminal device.

Variations of this embodiment will now be described. In a first variation, the first confirmation screen 700 and the second confirmation screen 800 may each be displayed not only on the display panel of the multifunctional apparatus 100, but also on the display panel of the mobile terminal device 200. A press of the cancel button 701 or 801 in the confirmation screen 700 or 800 may cause information to be displayed on the display panel in a mobile terminal device 200 serving as a non-mate device, informing that the setting request has been rejected by the currently operating user.

In a second variation, the multifunctional apparatus 100 may be configured to display the second confirmation screen 800 when the number of receptions of a setting request from another mobile terminal device reaches or exceeds a threshold.

In a third variation, the multifunctional apparatus 100 may perform the following process if the cancel button 701 or 801 is pressed in the confirmation screen 700 or 800, and another setting request is thereafter received: when a second or later re-setting request is received, the multifunctional apparatus 100 may skip displaying a pop-up window and reject the request until the mobile terminal device connected at the time of processing releases the connection. Alternatively, the multifunctional apparatus 100 may reject the request for a particular time period.

In fourth variation, when the mobile terminal device connected at the time of processing releases the connection, the multifunctional apparatus 100 may send, to the mobile terminal device whose connection request has been disconnected, information informing that connection can now be established. In addition, the mobile terminal device whose connection request has been disconnected may be put into an operable state after the rejection. In still another example, the mobile terminal device whose connection request has been disconnected may be caused to display a message such as "Another mobile terminal is currently connected. Please wait for a moment." in the operation unit 204, and may be put into a state in which the connection request can be canceled or into a waiting state to wait until connection will be available.

In a fifth variation, when the multifunctional apparatus 100 is connected with one mobile terminal device, and receives setting requests from other mobile terminal devices 200, the multifunctional apparatus 100 may perform the following processing. The mobile terminal device already connected is hereinafter referred to as mobile terminal device A, and other mobile terminal devices 200 that transmit setting requests while the mobile terminal device A is connected are hereinafter referred to, in order of setting request transmission, as mobile terminal devices B, C, and D. In this case, the multifunctional apparatus 100 stores the session IDs of the mobile terminals B to D in order of setting request reception. When the mobile terminal device A releases the connection, the multifunctional apparatus 100 may send, to the mobile terminal devices B to D, notification information informing that connection may be established in order.

In a sixth variation, when the multifunctional apparatus 100 is left without any further operation performed after a setting request is received from one mobile terminal device, and there is no change in the screen of the display panel of the multifunctional apparatus 100 for a predetermined time period, the multifunctional apparatus 100 may perform the following processing. For example, if a function is provided that allows automatic screen transition to the home screen 300 or other screen, and this function is inactivated, the multifunctional apparatus 100 may cause the mobile terminal device that has sent a setting request to automatically release the connection to the multifunctional apparatus 100 based on a condition that, for example, the mobile terminal does not operate a specific application program for controlling the destination setting function for a predetermined time period.

The embodiment and the variants thereof described above can enhance user convenience when destination information is received from a terminal device such as a mobile terminal.

The present invention has been described with reference to at least one embodiment. It is understood, however, that the present invention is not limited to such embodiments, and various modifications and changes may be made thereto without departing from the spirit or scope of the present invention as defined in the appended claims.

OTHER EMBODIMENTS

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-181603, filed Sep. 16, 2016, which is hereby incorporated by reference herein in its entirety.

What is claimed is:

1. An image processing apparatus comprising:
a communicator that receives a first destination and first identification information from a first mobile terminal, wherein the communicator receives a second destination and second identification information from a second mobile terminal; and
a controller that sets the first destination received by the communicator as a transmission destination of one transmission job,
wherein the controller performs the one transmission job for transmitting, in multicast transmission, data to the transmission destination of the one transmission job, the transmission destination including a plurality of destinations, and
wherein the controller determines, based on at least the received first identification information and the received second identification information, whether or not to add the received second destination to the one transmission destination of the transmission job to which the received first destination has been set.

2. The image processing apparatus according to claim 1, further comprising:
a display that displays a confirmation screen;
wherein in a case that the controller determines to add the received second destination to the transmission destination of the one transmission job in which the received first destination has been set, the display displays a first confirmation screen, and
wherein, in a case that the controller determines not to add the received second destination to the transmission destination of the one transmission job in which the received first destination has been set, the display unit displays a second confirmation screen different from the first confirmation screen.

3. The image processing apparatus according to claim 2, wherein the first confirmation screen is a screen for inquiring a user whether to set the received second destination.

4. The image processing apparatus according to claim 2, wherein the second confirmation screen is a screen for inquiring a user whether to cancel the received second destination.

5. The image processing apparatus according to claim 2, wherein, in accordance with a user operation received in a state that the first confirmation screen is displayed, the image processing apparatus becomes the state that the first destination and the second destination are set to the one transmission job.

6. The image processing apparatus according to claim 1, further comprising:
a scanner that scans an image of a document to generate image data; and
a transmitter that transmits the image data generated by the scanner to the transmission destination by performing the one transmission job by the controller.

7. The image processing apparatus according to claim 1, wherein the first identification information is session ID, and
wherein the second identification information is session ID.

8. The image processing apparatus according to claim 1, wherein the controller determines, based on mismatch of the received first identification information and the received second identification information, not to add the received second destination to the transmission destination of the transmission job to which the received first destination has been set.

9. A method for controlling an image processing apparatus includes a controller and a communicator, the method comprising:
receiving, by the communicator, a first destination and first identification information from a first mobile terminal;
wherein receiving, by the communicator, a second destination and second identification information from a second mobile terminal;
setting, by the controller, the first destination received by the communicator as a transmission destination of one transmission job;

performing, by the controller, the one transmission job for transmitting, in multicast transmission, data to the transmission destination of the one transmission job, the transmission destination including a plurality of destinations; and determining, by the controller, based on at least the received first identification information and the received second identification information, whether or not to add the received second destination to the transmission destination of the one transmission job to which the received first destination has been set.

\* \* \* \* \*